United States Patent
Cate

[11] 3,741,596
[45] June 26, 1973

[54] MOTORCYCLE SEAT
[76] Inventor: William D. Cate, 3715 Avalon Street, West Riverside, Calif. 92509
[22] Filed: June 17, 1971
[21] Appl. No.: 154,026

[52] U.S. Cl. .............................................. 297/195
[51] Int. Cl. ............................................ A47b 19/00
[58] Field of Search ..................... 297/DIG. 9, 243, 297/214, 195, 451, 452, 454; 90/15, 16; 230/90, 95

[56] References Cited
UNITED STATES PATENTS

| | | |
|---|---|---|
| 3,425,745 | 2/1969 | Michels .......................... 297/DIG. 9 |
| 2,784,769 | 3/1957 | Fisher ................................ 297/451 |
| D216,609 | 2/1970 | Ross ...................................... 90/16 |
| 3,269,773 | 8/1966 | O'Connor .......................... 297/314 |

Primary Examiner—Bernard A. Gelak
Assistant Examiner—Garry Moore
Attorney—John H. Crowe et al.

[57] ABSTRACT

A motorcycle seat with built-in means for retaining a safety bar in position. The seat has a frame made up of a bottom plate and a sturdy cast aluminum back member. The bottom plate is contoured to provide good seating comfort for an operator and passenger, and the aluminum back member is mounted at the rear of the plate to serve as an upwardly extending and rearwardly sloping backstop for the seat. The back member is fastened to the bottom plate by means of a metal tie strap bent sharply to extend along the top of the plate and then upwardly, flush against the forward face of the back member. The back member has receptive bores for the lower ends of the legs of a safety bar formed from a doubled length of metal rod. Running upwardly through the bottom plate and into the back member are aligned openings for a pair of bolts. These openings are of smaller diameter than, and positioned in alignment with, the bores for the safety bar legs. The bottoms of the safety bar legs have tapped holes designed to receive the bolts in threaded engagement and the safety bar is fastened in place by fitting the bolts through the openings in the plate, then tightening them in the tapped holes in the safety bar legs. The seat is finished by covering the frame with a suitable padding and upholstery.

9 Claims, 9 Drawing Figures

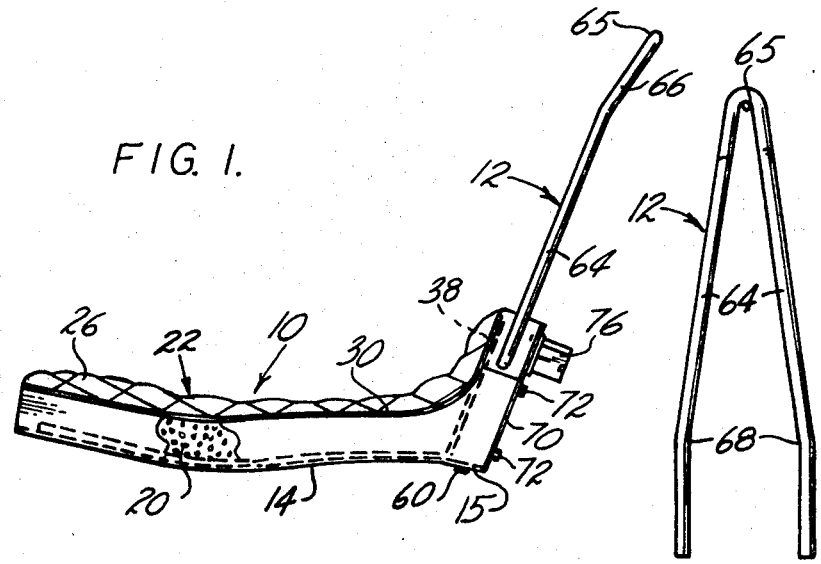
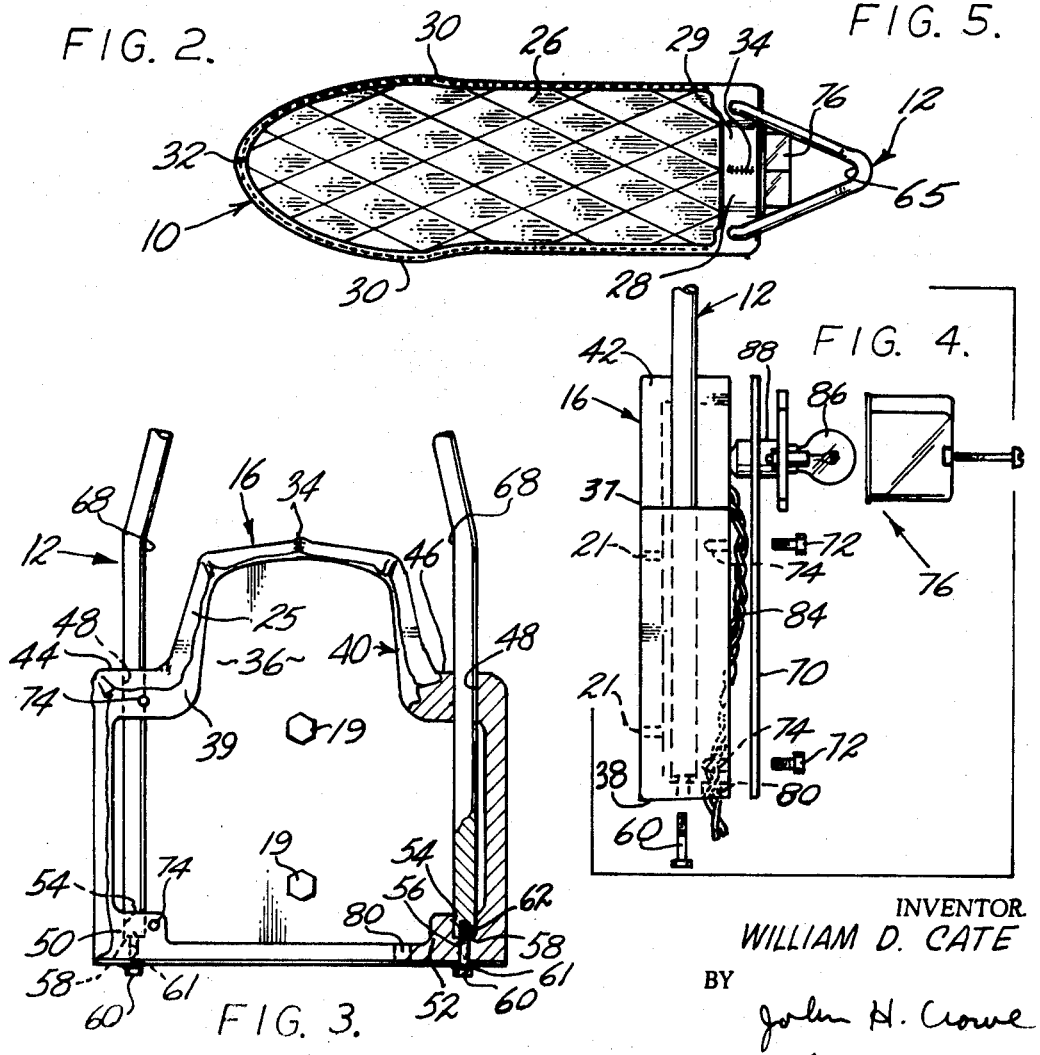

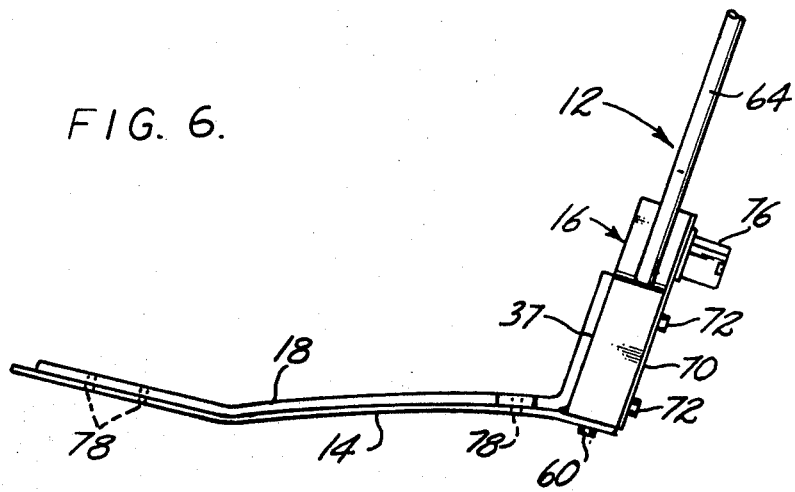
FIG. 6.
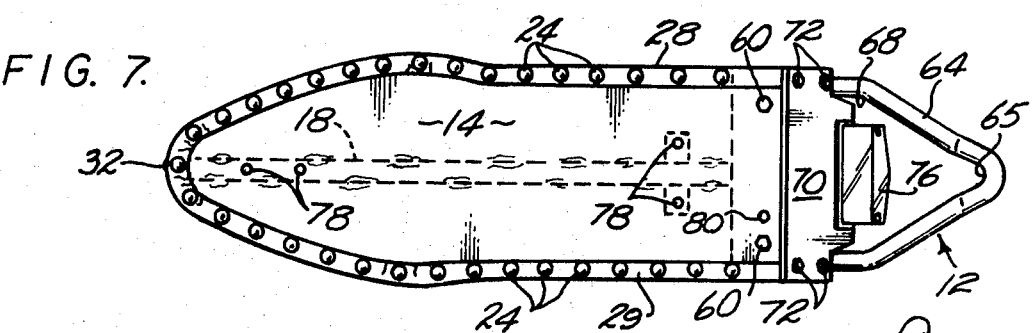
FIG. 7.
FIG. 8.
FIG. 9.
INVENTOR.
WILLIAM D. CATE
BY
John H. Crowe
AGENT

MOTORCYCLE SEAT

BACKGROUND OF THE INVENTION

This invention relates to a motorcycle seat of new and unique design, and more particularly to such a seat with built-in means for holding a rear safety bar firmly in position for the protection of a passenger riding behind a motorcycle driver or operator.

Motorcycle riding has become an increasingly popular pastime during the past few years. As a result of this trend, the use of motorcycles of all sizes and classes has recently increased to a noticeable extent, not only among the young, but among older people as well. The modern motorcycle typically has a seat long enough to accommodate a passenger behind the operator, and it is quite common to see bikes with two riders wherever motorcycles are encountered. It is not unusual, in this connection, to see middleaged couples taking to the open road on motorcycles, usually with the women in rear positions on the motorcycle seats, and the men operating the machines.

While most motorcycle seats have room to accommodate two riders, the one to the rear, or passenger, is in a somewhat precarious position, since he does not have the handlebars to hold onto. Unless the passenger holds tightly onto the driver, he can easily be thrown off, particularly when the machine accelerates or leans to one side when the operator is turning a corner. Consequently, some motorcycles are now provided with "sissy bars," or, as they are more accurately called, safety bars, positioned at the rear of the bike seats. The typical safety bar is fashioned from a length of metal rod to serve as a U-shaped or V-shaped backrest, and has a pair of legs fastened to the motorcycle by means of bolt holes in the motorcycle frame, seat bracket and seat. This is a rather crude arrangement which results in a safety bar of less than optimum strength and dependability under emergency conditions, even though it serves its purpose reasonably well under normal riding conditions. Moreover, the mounting of such a safety bar on a motorcycle is not a particularly simple or easy job, and requires the expertise of a skilled shop man, and the proper tools and facilities, for most effective results. Thus, the installation of a safety bar can add significantly to the cost of a cycle. Another disadvantage of this type of safety bar is that its crude method of mounting results in an inherent height limitation. The results of such a limitation are diminished safety in the event of an emergency, reduced riding comfort (and sometimes actual discomfort) for motorcycle passengers, and lack of safety bar space for non-safety purposes, such as for the support of books, jackets, lunch boxes, etc. (which cannot be conveniently carried elsewhere on most motorcycles).

For the foregoing reasons, motorcycle safety bars in their presently existing forms leave ample room for improvement. The need for such improvement is felt most in jurisdictions which require the installation of safety bars for the protection of motorcycle passengers. I am aware of one such jurisdiction and have no doubt there are others in the United States. The provision of a motorcycle seat with built-in means for the firm anchoring of a safety bar (of adequate size to reasonably protect a passenger in the event of emergency) with a minimum of skill and effort would overcome the above-noted shortcomings of presently existing safety bars. To date, however, no one has, to my knowledge, come up with such a motorcycle seat.

SUMMARY OF THE INVENTION

The novel motorcycle seat of this invention is designed for installation and use on a wide variety of motorcycles, including the great majority of those distributed and sold in the United States. The seat has a rigid frame, preferably of metal construction, covered with padding and upholstery, and is shaped and styled to provide relatively lightweight seating support for a motorcycle operator and passenger riding double on a bike. The seat differs from any bike seat of presently conventional design in having a raised back of sufficient height to prevent backward sliding of the motorcycle passenger off of the seat while the machine is in motion. This raised back is made possible by the presence of a sturdy back member which is fastened to a plate forming the bottom of the seat frame in such fashion as to extend upwardly, in backward slanting direction, therefrom. The bottom plate and back member, thus fastened together, form the above-mentioned seat frame.

In addition to providing a frame for the raised back of the motorcycle seat, the aforesaid back member is designed to serve as an anchor base for a safety bar for the protection and comfort of a passenger riding on the seat. The safety bar is of somewhat similar character to presently known safety bars of the abovedescribed type, but differs structurally therefrom in such a way as to permit its lower end (actually, the lower ends of two legs forming a major portion of the bar) to be firmly anchored in the back member of the seat frame. This method of safety bar attachment, as will be seen, provides substantially stronger support for the base of the safety bar than does the conventional method of attachment referred to above. Because of this, my safety bar can, I have discovered, be made to provide from six to eight inches more height above the seat level (by comparison with conventional safety bars) for the comfort and protection of bike passengers.

The back member of the rigid frame of my motorcycle seat is preferably an aluminum, or other lightweight metal, casting, hollowed from one side and shaped to fit on the rear end of the bottom plate member of the frame so as to extend upwardly, and at the proper degree of slant, therefrom, to provide a comfortable back for the seat. A tie bar is preferably employed to make the back member fast to the bottom plate, in a manner hereinafter described in detail. The back member is mounted on the bottom plate so that its hollow side faces to the rear, and it is provided with appropriately sized and spaced bore holes to admit the legs of the safety bar and permit them to be anchored firmly in place. Because of its hollowed form, this preferred version of the back member has two bore holes for each of the safety bar legs, one passing through peripheral wall structure at the top of the member and the other passing downwardly, in alignment with the first hole, into peripheral wall structure below the hollow part of said member.

Passing upwardly into the back member, in axial alignment with the bore holes for the safety bar legs therein, are a pair of apertures for the sliding reception of two bolts. These apertures are of smaller diameter than said bore holes, and they communicate, at their upper ends, with the bottom ends of the lower bore holes, so that shoulders are formed between the bore holes and the apertures against which the lower ends of the safety bar legs abut when they are fully inserted in the bore holes. The bottom plate of the seat frame has a pair of like apertures, spaced for alignment with the apertures in the bottom of the back member when the latter is positioned on the plate as described above. To anchor the safety bar in place on the seat, its two legs are first inserted into the bore holes in the back member of the seat frame until their lower ends abut the aforesaid shoulders in the bottom bore holes, and a pair of bolts are then inserted upwardly through the bottom plate of the seat frame and into the back member. The lower ends of the safety bar legs have tapped holes sized for threaded engagement with said bolts, and the bolts are tightened in these tapped holes to secure the safety bar firmly to the motorcycle seat.

As those familiar with motorcycles, and the hazards of riding double on these vehicles, can appreciate, the novel seat-safety bar combination of this invention provides an attractive and relatively inexpensive means of overcoming the above-noted disadvantages and shortcomings of presently existing motorcycle safety bar arrangements. In line with this, it is a principal object of the present invention to provide an attractive, relatively lightweight motorcycle seat which can be mounted, with minimal difficulty, on almost any bike of presently available type, with built-in seat back means to protect a passenger from the possibility of sliding backwardly off of the seat when the motorcycle is in motion.

It is another object of the invention to provide such a seat on which a safety bar can be installed with minimal difficulty, and which is inherently capable of retaining the mounted bar firmly in position for the protection of a motorcycle passenger riding on the seat.

It is a further object of the invention to provide means for the simple and easy installation of a motorcycle safety bar which is substantially stronger (and extends higher) than the typical safety bar of presently known type.

Yet another object of the invention is to provide means for the attachment of a safety bar of superior strength to a motorcycle with minimal difficulty, and without any troublesome and time-consuming necessity of bolting the safety bar to the frame, or seat bracket, of said motorcycle.

It is still another object of the invention to provide a motorcycle seat with rear means for the convenient accommodation of a license plate and taillight in firmly anchored positions thereon.

Other objects, features and advantages of the invention will become apparent in the light of subsequent disclosures herein.

BRIEF DESCRIPTION OF THE DRAWINGS

FIG. 1 is a side elevation of a preferred embodiment of a motorcycle seat and attached safety bar in accordance with this invention.

FIG. 2 is a plan view of the motorcycle seat and safety bar.

FIG. 3 is an enlarged rear view of a back member forming an important part of the seat frame and adapted to hold the safety bar in firm attachment to said seat, the figure showing, additionally, fragmentary portions of the attached safety bar and cooperating seat components and hardware, portions of the back member and safety bar being shown in section to better illustrate the interfitting relationship between the safety bar and seat.

FIG. 4 is a side elevation of said back member, showing a fragmentary part of the safety bar in interfitted relationship therewith, and showing, also, certain components and hardware (including a taillight) cooperative therewith to form the finished motorcycle seat, as well as showing, in dashed lines, some of the hidden features of the back member.

FIG. 5 is a front elevation of the safety bar removed from the motorcycle seat and drawn to a scale slightly larger than the FIG. 1 scale.

FIG. 6 is a fragmentary side elevation of the seat and attached safety bar stripped of padding and upholstery so that the details of the seat frame are visible, the scale of the drawing being slightly larger than that of FIG. 1.

FIG. 7 is a slightly enlarged bottom view of the FIG. 1 seat with safety bar attached.

FIG. 8 is an enlarged rear view of the fully assembled seat with a taillight and license plate affixed thereto.

FIG. 9 is a fragmentary side elevation of a safety bar similar to that shown in the other figures, but with a padded backrest mounted between its legs to suit it for use on a modified form of the invention.

DESCRIPTION OF THE PREFERRED EMBODIMENT

Considering now the drawings in greater detail, there is shown generally at 10 (see FIGS. 1 and 2) a preferred embodiment of a motorcycle seat in accordance with this invention, with a two-pronged safety bar 12 fixedly secured thereto. The seat 10 has a rigid metallic frame, comprising a relatively thin bottom plate 14 and a sturdy back member 16 fastened together by means of a tie bar 18. Bottom plate 14 is made from tough sheet metal stock, such as, for example, 14-gauge tin stock, and is peripherally shaped and contoured to comfortably accommodate a pair of motorcycle riders. Additionally, the bottom plate is contoured to provide a properly angled rear segment 15 for support of back member 16 in the manner hereinafter described. Back member 16 is preferably of cast aluminum construction, and solid enough to serve as the core, or skeleton, of a strong, dependable backstop for the protection of rear riders on the seat. Lightness of weight is an advantage in seat 10, and for this, and other, reasons, back member 16 is hollowed from the rear in a manner soon to be described. While back member 16 is, as indicated, preferably made of aluminum, such a member could, if desired, be fabricated from any other suitably strong and tough metal, the lighter in weight the better. It is even within the scope of my invention to form this back member from a nonmetallic material suitably strong and tough enough for the purpose, such as, for example, a plastic meeting the necessary qualifications.

As previously indicated, bottom plate 14 of the aforesaid seat frame is angled at its rear to provide a suitable base of support for the back member 16. The bottom of the back member, shown at 38 in FIG. 4, slopes slightly upwardly between its front and rear edges to form a beveled surface which rests on this angled portion (rear segment 15) of the bottom plate in the assembled seat. The cooperating fit of angled rear segment 15 of the bottom plate against the beveled bottom surface of the back member, and the surface angles of the involved ports, are such as to assure the right degree of backward slant in the back member for the seat backstop purposes mentioned above. Tie bar 18 is simply a length of flat metal rod, preferably 1 × ⅜ inch steel rod, bent to fit longitudinally along the upper surface of bottom plate 14 for a portion of its length, and then extend up the center of the forward face of back member 16, all in the manner illustrated in FIGS. 1, 6 and 7. The tie bar is preferably welded in position to the top of the bottom plate, and it is securely fastened against the forward face of back member 16 by means of a pair of bolts 19, adapted to pass, from the rear, through a pair of bolt openings 21, best seen in FIG. 4, in the back member and into tapped holes in the tie bar sized to receive the bolts in threaded engagement.

Seat 10 is finished with two inches of a suitably resilient padding material 20, such as, for example, polyurethane foam padding, encased in vinyl upholstery. This upholstery consists of three pieces of vinyl, one piece 26 being of diamond pattern design and sized to cover the upper surface of the seat, and the other two pieces 28 and 29 being cut to symmetrically cover the sides of the seat. The piece of diamond pattern upholstery 26 is stitched around its edge to the two side pieces, as shown at 30, and the two side pieces are stitched together at the front and rear of the seat in the manner illustrated at 32 and 34, respectively. The upholstery is stretched tight over the padding, and fastened around the edge of the bottom of bottom plate 14 by means of a plurality of pop rivets, shown at 24 in FIG. 7.

The edges of the upholstery at the rear of the seat are pulled tightly around the sides of back member 16 and fastened in place to the back of that member with a suitable glue, in the manner fragmentarily illustrated at 25 in FIG. 3. The above-mentioned padding and upholstering materials are conventional, and upholstering methods by means of which they can be fitted to seat 10 in the illustrated manner will be known or obvious to those skilled in the art in the light of the present teachings. Needless to say, other suitable padding and upholstering materials can be substituted for the preferred materials discussed above within the scope of my invention. Other vinyl patterns, besides the abovementioned diamond pattern, can be employed for the upholstering of seats in accordance with this invention, examples of which include tuck-and-roll and plain vinyl patterns.

Back member 16 serves to provide a sturdy backstop for preventing motorcycle passengers from sliding backwards off of seat 10, a feature not found on conventional motorcycle seats, which have little or no means to prevent such sliding. More importantly, however, the back member is designed to receive the lower ends of the two prongs or legs of safety bar 12, and hold them in position for attachment to the seat in the herein-taught manner. As a result, the back member serves to permit the easy installation of safety bar 12 on seat 10, and to thereafter hold the bar firmly against slippage, or breakage, in use. To make this possible, back member 16 has receptive bores, soon to be described, for the lower ends of the safety bar legs, and simplified cooperating means for firmly locking the legs in position, once they are inserted in said bores. Safety bar 12 is formed from tough metal rod, preferably round steel rod of ½-inch cross-sectional diameter, although any other suitable rod stock can be employed within the scope of the invention. Safety bar 12 has an elongate, V-shaped portion 64, consisting of two prongs or legs diverging downwardly from an upper vertex 65 to a pair of bends 68, below which the legs are parallel and form the remaining part (or parts) of the bar. As the drawing illustrates, safety bar 12 is positioned to angle backwardly, relative to the upper surface of seat 10, for the riding comfort of passengers on the seat. Near the upper end of the safety bar, the angle of its backward slope is increased, as shown at 66 in FIG. 1, for still greater passenger comfort.

As indicated above, back member 16 of the frame of motorcycle seat 10 is hollowed from the rear. Thus, the back member is somewhat bowl-shaped, having a flat bottom 37, which constitutes the forwardly facing side of that member, and a rearwardly facing rim 39 forming the outer limit of an encircling wall 40 around the hollowed part of the member. FIG. 3 shows a rear view of back member 16, with its encircling wall 40 and rim 39. The bottom of the hollow in back member 16 is flat, as shown at 36 in FIG. 3. The lower periphery of the back member is squared, but its upper part, as seen in silhouette, has an arched central part 42 flanked by a pair of shoulders 44 and 46. This is a preferred, but not critical, configuration which adds strength and attractiveness of appearance to the seat and, more importantly, provides space for the accommodation of a taillight, such as best seen at 76 in FIGS. 1, 6 and 8. As FIG. 3 shows, shoulders 44 and 46 are formed by portions of wall 40 which are thicker than adjacent portions of the wall. Also as that figure shows, the ends of the bottom part of wall 40 (running along the squared bottom of the back member) are thicker than the intermediate portion of said wall, for a purpose hereinafter appearing. The thickened segments of this bottom portion of the wall are shown at 50 and 52, respectively, in FIG. 3. Back member 16, as FIGS. 3 and 8 make clear, is symmetrical about a vertical axis.

Disposed equidistantly from the vertical axis of back member 16, in those portions of wall 40 forming shoulders 44 and 46, are a pair of bores 48, sized and spaced to slidably receive the lower, parallel segments of the legs of safety bar 12. In the upper parts of the thickened portions 50 and 52 of the bottom portion of wall 40, in line with bores 48, are two other bores 54. In axial alignment with the bores 54 are a pair of communicating smaller bores 56, which run upwardly into wall 40 from the bottom of the back member. Where the smaller bores 56 meet bores 54 there are a pair of annular shoulders 58 defining the lower ends of the latter. Bores 56 are sized to snugly receive a pair of bolts 60, for a purpose hereinafter appearing.

Respectively aligned with bores 56 in the bottom of wall 40 of back member 16 are a pair of equally sized bores 61 in bottom plate 14. This alignment of the bores 61 in the bottom plate and bores 56 in wall 40 of back member 16 is, of course, present when the bottom plate and back member of the seat frame are assembled in the manner illustrated in the d drawings, and it permits the upward insertion of the bolts 60 through the respectively aligned bores in the bottom plate and back member. As will now be apparent, and the drawings illustrate, bolts 60 serve to fasten the lower ends of the legs of safety bar 12 in position, for which purpose each leg is provided with a tapped hole 62 properly sized and positioned to receive one of the bolts in threaded engagement.

Safety bar 12 is positioned for use by sliding the parallel lower ends of its legs into the above-described bores in the shoulder and bottom segments of wall 40 of the back member, until the legs abut annular shoulders 58 at the bottom ends of the lower pair of bores. Bolts 60 are then passed upwardly through the aligned bores 61 and 56 in the bottom plate and wall of the back member, and tightened in place in the tapped holes 62 in the bottoms of the safety bar legs. The safety bar is now firmly fastened at the bottom, and capable of withstanding a substantial amount of shock without danger of breakage or dislodgement from the seat. As will be apparent, the lower bores 56 in back member 16 help greatly to steady the safety bar against the possibility of side-to-side movement under stress.

The above-described fastening arrangement makes possible the provision of a safety bar of substantially greater strength and stability than any presently known safety bar of which I am aware. Also, as previously indicated, the superior ability of my novel motorcycle seat to hold a safety bar firmly in secured position makes possible the use of safety bars from six to eight inches higher than many of those presently in use. In addition to providing motorcycle passengers with greater comfort and safety, safety bars of increased height can be used to advantage as convenient racks for the carrying of books, jackets, lunch boxes, etc.

A thin flat metal cover 70 fits over the hollowed rear side of back member 16 and forms a panel to which a taillight and license plate can, if desired, be affixed. Cover 70 is attached to the back member by means of four bolts 72, wall 40 of the back member being provided with four tapped holes 74 sized and positioned to receive the four bolts. Two of these holes can be seen in FIGS. 3 and 4, and FIG. 8 shows the bolts 72 fastened in place in the four holes. Metal cover 70 has four openings appropriately spaced for alignment with the holes 74 in the back member, and sized to receive the bolts 72, to permit fastening of the cover to the back member in the above-indicated fashion.

A taillight 76, previously mentioned, is mounted on the upper portion of metal cover 70, adjacent the arched upper part of back member 16. Taillight 70 is a lighting fixture of conventional type, not necessary to describe in detail here, mounted on cover 70 in conventional fashion. To make this possible, there are provided in the metal cover 70 appropriately sized and positioned openings, not shown, for light bulb socket 86 and mounting screw components of the taillight. Since the taillight and its method of installation are conventional, and the light does not form a critical part of my novel motorcycle seat, it has not been illustrated, nor described, in a great amount of detail herein. The light has the usual bulb 86, which fits into the above-mentioned socket, and is provided with conductor wires 84 to connect the bulb with a source of electrical energy. As FIGS. 3 and 4 make clear, the light bulb socket is disposed behind metal cover 70, in the hollow surrounded by wall 40 of back member 16, and there are aligned holes in the bottom segment of the wall and bottom plate 14 of the seat frame which cooperate to form an opening 80 in said seat frame through which the wires pass.

As will be apparent from the foregoing, and the accompanying drawings, the hollow part of back member 16 is sufficiently commodious to receive light bulb socket 86 with room to spare. As should also be apparent, the arch-shaped upper part of back member 16 is designed to accommodate the taillight and leave the major portion of the back of that member free of encumbrance. This unencumbered portion of the back member (or, more accurately, of metal cover 70), is ideally sized to receive a license plate in the manner illustrated in FIG. 8, which shows such a plate 82 fastened thereover and held in place by means of the four cover bolts 72.

In brief summary of the unique characteristics of back member 16, that member serves four separate purposes (none heretofore served by any motorcycle component of which I am aware), namely, that of providing a back stop for seated motorcycle passengers to keep them from sliding backwardly off of moving motorcycles; a rugged anchor base for a safety bar of superior strength and stability; a site for the mounting of a taillight in a position of solid support; and a conveniently accessible mounting site for a license plate affording excellent license plate visibility from the rear. As those familiar with motorcycles and their accessories will appreciate, a taillight or license plate mounted on back member 16 will, by virtue of the unique design of that member, be held more firmly and securely than its counterpart on a conventional motorcycle is held. While back member 16 represents a preferred form of a seat frame member in accordance with this invention, it does not, as previously indicated, represent the only permissible form thereof. A back member without the optional receptivity to taillight and/or license plate installation of back member 16 (but otherwise suitable for purposes taught herein) would, for example, fall squarely within the scope of my invention.

There are four tapped holes 78 in the bottom of seat 10 to permit easy installation of the seat on a universal sliding bracket for mounting of said seat on a motorcycle. This merely requires the use of four bolts sized to threadedly engage holes 78 and is a conventional way of mounting motorcycle seats, hence need not be discussed in detail here.

FIG. 9 shows a safety bar 12' (of similar shape to safety bar 12) positioned for use with a back cushion 90 mounted between its legs. Cushion 90 is held in place by means of a plurality of screws 92 which pass through receptive openings in said legs to threaded engagement with tapped holes in a thick metal plate (not shown) serving as a backplate for the cushion. Other means of fastening a back cushion in position between the legs of a safety bar can, of course, be employed for purposes of this invention. For example, such a cushion could have depending means suitable for attachment to back member 16, or its equivalent, in such a way as to firmly anchor the cushion to the seat frame for use in conjunction therewith. Or, the back cushion could be fastened in position between the safety bar legs by means of attached crosspieces bolted, welded, or otherwise affixed at their ends to said legs.

While the novel motorcycle seat of this invention has been herein described and illustrated in what are considered to be preferred embodiments, it will be understood by those skilled in the art that numerous departures may be made therefrom within the scope of the invention. Certain of these departures have already been mentioned, and others will occur to those skilled in the art in the light of present teachings. In summary, the scope of the present invention extends to all variant forms thereof encompassed by the language of the following claims.

I claim:

1. Slab-like backstop means suitable as a strong, sturdy frame for the inclined back of a motorcycle seat and having a plurality of bores designed to slidably receive the lower ends of the legs of an elongate U-shaped safety bar and hold the latter in an inclined position of upward extension from the rear of said seat for the protection of persons riding on the seat; said slab-like backstop means being adapted to permit the locking of said safety bar in the aforesaid position by means of bolts tightened in threaded engagement with tapped holes of appropriate size in the bottom of the legs of the safety bar;

said slab-like backstop means being removably securable in position as part of a motorcycle seat frame to form said frame for said inclined back of said motorcycle seat;

said bores being first bores of round cross section with lower ends disposed within the body of said backstop means; and said backstop means having second bores of smaller cross section than the first bores disposed in axial alignment and communication with the latter, whereby annular shoulders separate the first and second bores and serve as supporting abutments for the lower ends of the legs of said safety bar against which said legs are tightly drawn when the safety bar is locked in place on the motorcycle seat by means of said bolts.

2. Slab-like backstop means in accordance with claim 1 having a hollow accessible from the rearward face thereof, which hollow is peripherally surrounded by relatively thick walls forming the major portions of the top, bottom and sides of said backstop means; and in which said first bores are two pairs of aligned bore holes in the respective top and bottom walls of said backstop means and said annular shoulders separating the first and second bores are disposed in said bottom walls; and having an oblique bottom surface to give the backstop means the proper angle of inclination for the back of said motorcycle seat when said backstop means is secured in position as part of said motorcycle seat frame.

3. Slab-like backstop means in accordance with claim 2 symmetrically disposed about a first axis running up its inclined face, as seen in front elevation in its position of use as a part of said motorcycle seat frame, and adapted to permit the removable attachment of a back cover which fits over said hollow and on which can be mounted a license plate and motorcycle taillight; and in which said first bores and said second bores are disposed along a pair of axes positioned equidistantly from, and parallel to, said first axis.

4. Slab-like backstop means in accordance with claim 3 of cast aluminum construction.

5. Motorcycle seat means comprising, in combination:

a motorcycle seat frame including, as an important part of the frame structure, slab-like backstop means suitable as a strong, sturdy frame for the inclined back of a motorcycle seat and having a plurality of bores designed to slidably receive the lower ends of an elongate U-shaped safety bar and hold the latter in inclined position of upward extension from the rear of said seat for the protection of persons riding on the seat, said slab-like backstop means being adapted to permit the locking of said safety bar in the aforesaid position by means of bolts tightened in threaded engagement with tapped holes of appropriate size in the bottom of the legs of the safety bar; and suitable padding and upholstery to convert the frame into said seat means.

6. Motorcycle seat means in accordance with claim 5 designed to accommodate a pair of riders, in which:

said motorcycle seat frame includes a rigid bottom plate having a peripheral shape adapted to comfortably accommodate said pair of riders in seated position; and said slab-like backstop means is adapted to rest, in inclined position, on the rear end of said bottom plate, and is removably securable in such position by means interconnecting it with said bottom plate;

said bottom plate being appropriately contoured, and all involved parts being appropriately sized and shaped, so that said slab-like backstop means, in its inclined position, helps to provide a comfortably sloping back for the motorcycle seat means.

7. Motorcycle seat means in accordance with claim 6 in which said slab-like backstop means has a flat front face and in which said means interconnecting said slab-like backstop means and said bottom plate comprises a flat metal rod fixedly secured to the upper surface of said bottom plate and bent at the proper angle to fit flush against the front face of said backstop means in its inclined position of use on said bottom plate, said flat rod and said backstop means having aligned openings for bolts to permit them to be fastened together by means of said bolts.

8. Motorcycle seat means in accordance with claim 6 including an elongate safety bar with two symmetrical legs of round cross section bent towards each other through a sharp bend, said legs being sized and spaced to fit slidably within said first bores of said slab-like backstop means and having concentric holes tapped in their lower ends; and in which said bottom plate has a pair of apertures in alignment with said concentric holes; and in which said apertures and said concentric holes in the lower ends of the safety bar legs are sized and relatively positioned to permit the upward insertion of said bolts through said bottom plate and into said concentric holes, and the tightening of said bolts in the concentric holes to lock said safety bar in a position of use as a part of the seat means.

9. Motorcycle seat means in accordance with claim 8 including a back cushion adapted to fit between the legs of said safety bar and means for securing said cushion in this position so as to provide padded safety bar means for use as a part of said seat means.

* * * * *